(12) United States Patent
Kim et al.

(10) Patent No.: US 8,930,128 B2
(45) Date of Patent: Jan. 6, 2015

(54) VEHICLE COLLISION MITIGATION SYSTEM

(71) Applicant: Lit Motors Corporation, San Francisco, CA (US)

(72) Inventors: Daniel Kee Young Kim, Vancouver, WA (US); Marshall R. Millett, San Francisco, CA (US)

(73) Assignee: Lit Motors Corporation, San Francisco, CA (US)

( * ) Notice: Subject to any disclaimer, the term of this patent is extended or adjusted under 35 U.S.C. 154(b) by 0 days.

(21) Appl. No.: 13/777,934

(22) Filed: Feb. 26, 2013

(65) Prior Publication Data

US 2013/0238233 A1    Sep. 12, 2013

Related U.S. Application Data

(60) Provisional application No. 61/603,887, filed on Feb. 27, 2012, provisional application No. 61/603,889, filed on Feb. 27, 2012.

(51) Int. Cl.

| B60W 30/09 | (2012.01) |
| B60W 30/085 | (2012.01) |
| B60K 6/00 | (2006.01) |
| B60K 6/10 | (2006.01) |

(52) U.S. Cl.
CPC .............. *B60W 30/09* (2013.01); *B60W 30/085* (2013.01); *B60K 6/00* (2013.01); *B60K 6/105* (2013.01); *B60W 2420/42* (2013.01); *B60W 2420/52* (2013.01); *Y02T 10/6204* (2013.01); *Y02T 10/7033* (2013.01)
USPC ........................................... 701/301; 701/96

(58) Field of Classification Search
USPC ................... 701/301, 96; 180/54.1, 274, 275; 340/436, 903; 74/5 R
See application file for complete search history.

(56) References Cited

U.S. PATENT DOCUMENTS

| 2004/0019426 | A1 | 1/2004 | Knoop et al. | |
| 2004/0182629 | A1* | 9/2004 | Takahashi et al. ............ | 180/274 |
| 2007/0170667 | A1 | 7/2007 | Xu et al. | |
| 2008/0006498 | A1* | 1/2008 | Simmons ...................... | 188/382 |
| 2008/0288710 | A1* | 11/2008 | Maeda et al. .................. | 711/102 |
| 2011/0231041 | A1* | 9/2011 | Kim et al. ...................... | 701/22 |

OTHER PUBLICATIONS

PCT International Search Report and Written Opinion of the International Searching Authority for International Patent Application No. PCT/US2013/028086, mailed Jul. 11, 2013, whole document.

* cited by examiner

*Primary Examiner* — Marthe Marc-Coleman
(74) *Attorney, Agent, or Firm* — Blakely Sokoloff Taylor Zafman LLP

(57) ABSTRACT

Embodiments describe modules/logic/circuitry to receive image data identifying terrain, environment, and/or one or more objects near a vehicle, determine a projection of the one or more objects with respect to the vehicle, determine whether the one or more objects will collide with the vehicle, and in response to determining the one or more objects will collide, altering the vehicle state. In some embodiments, altering the vehicle state is based, at least in part, on a driver position with respect to the one or more objects determined to collide with the vehicle (e.g., moving the vehicle to protect the drive). In some embodiments, altering the vehicle state comprises at least one of adjusting brakes of the vehicle to alter its trajectory, adjusting a steering wheel of the vehicle to alter its trajectory and adjusting an orientation or rotational speed of a flywheel (for CMG assisted vehicles).

16 Claims, 13 Drawing Sheets

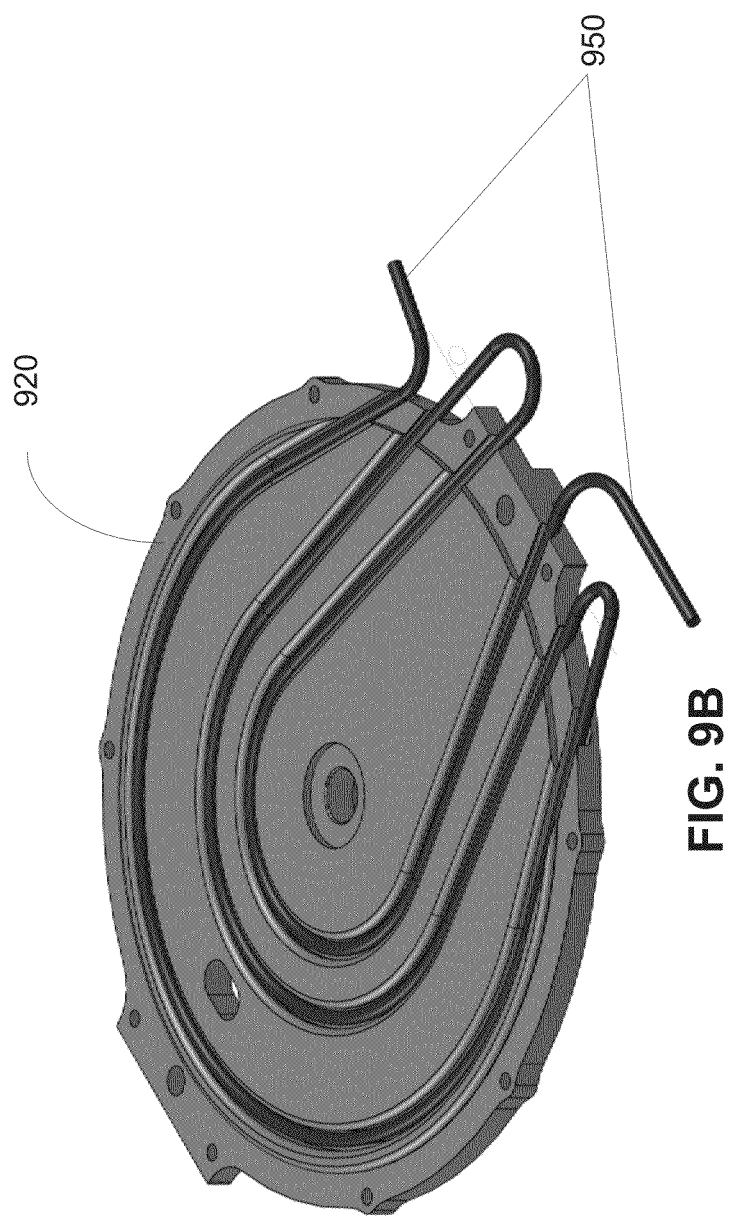

VEHICLE COLLISION MITIGATION SYSTEM

CLAIM OF PRIORITY

This application claims priority to Provisional Application No. 61/603,887 filed on Feb. 27, 2012 and to Provisional Application No. 61/603,889 filed on Feb. 27, 2012.

FIELD OF THE INVENTION

Embodiments of the invention generally pertain to transportation vehicles, and more particularly to vehicle control systems.

BACKGROUND

Current vehicle safety systems utilize various sensors for detecting objects relative to the vehicle; however these systems are extremely limited in their application and function. For example, vehicle backup assistance devices employ a camera and display to provide video images to the driver of the coverage zone behind the vehicle. In addition, various other sensors have been employed to detect objects located within the coverage zone proximate to the vehicle—for example, radar sensors have been used to detect an object, the distance to and the velocity of the object relative to the vehicle; however, these systems simply inform the driver of conditions surrounding the vehicle, and do not interact with vehicle systems to proactively, concurrently, or retroactively prevent, mitigate or reduce collision effects or protect the driver or passengers.

Increasingly, vehicles are being equipped with sensors that generate data for interpreting surrounding terrain and environment objects. Data generated from sensors may be utilized by various vehicular systems such as adaptive cruise control, braking, or other active safety features, however, the present invention will make apparent the ability, in one embodiment, to utilize sensory input and torque to alter the vehicle state using righting forces through a Control Moment Gyroscope (CMG) adaptive control system for orientation and rotational speed of one or more flywheels coupled to a vehicle.

Furthermore, as the demand increases for alternative vehicles such as hybrid, electric, and fuel cell vehicles, it becomes important to minimize vehicle weight and maximize vehicle interior volume. Current vehicle component cooling systems, such as radiators, are typically bolt-on components that significantly increase non-interior vehicle volume. Furthermore, current vehicle component cooling systems fail to address the significant heat generation of non-motor components, such as electrical components (e.g., computing device components). What is needed is a vehicle component cooling system that efficiently reduces vehicle component operating temperatures while also not adversely affecting vehicle size or weight.

SUMMARY

Embodiments of the invention are directed to vehicle control systems. In one embodiment, a method involves receiving spatial data identifying at least one of terrain, environment, or one or more objects near a vehicle. A projection of the terrain, the environment, or the one or more objects with respect to the vehicle is determined. The method also involves determining whether the terrain, the environment, or the one or more objects are to adversely affect the vehicle based on the determined projection of the terrain, the environment, or the one or more objects. In response to determining the terrain, the environment, or the one or more objects are to adversely affect the vehicle, the method involves altering the vehicle state via control moment gyroscope (CMG) active controls to change the projection of the vehicle frame with respect to the terrain, the environment, or the one or more objects. The vehicle includes a gyroscope coupled to a vehicle frame, and altering the vehicle state comprises adjusting an orientation or rotational speed of a flywheel of the gyroscope.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

FIG. 9A and FIG. 9B are illustrations of a gyroscopic device to utilize a cooling component according to an embodiment of the invention.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DESCRIPTION

Embodiments of the invention describe methods, apparatuses and systems for sensing and detecting terrain, environmental conditions, environmental objects, and assessing avoidance, and mitigation of vehicle collision. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
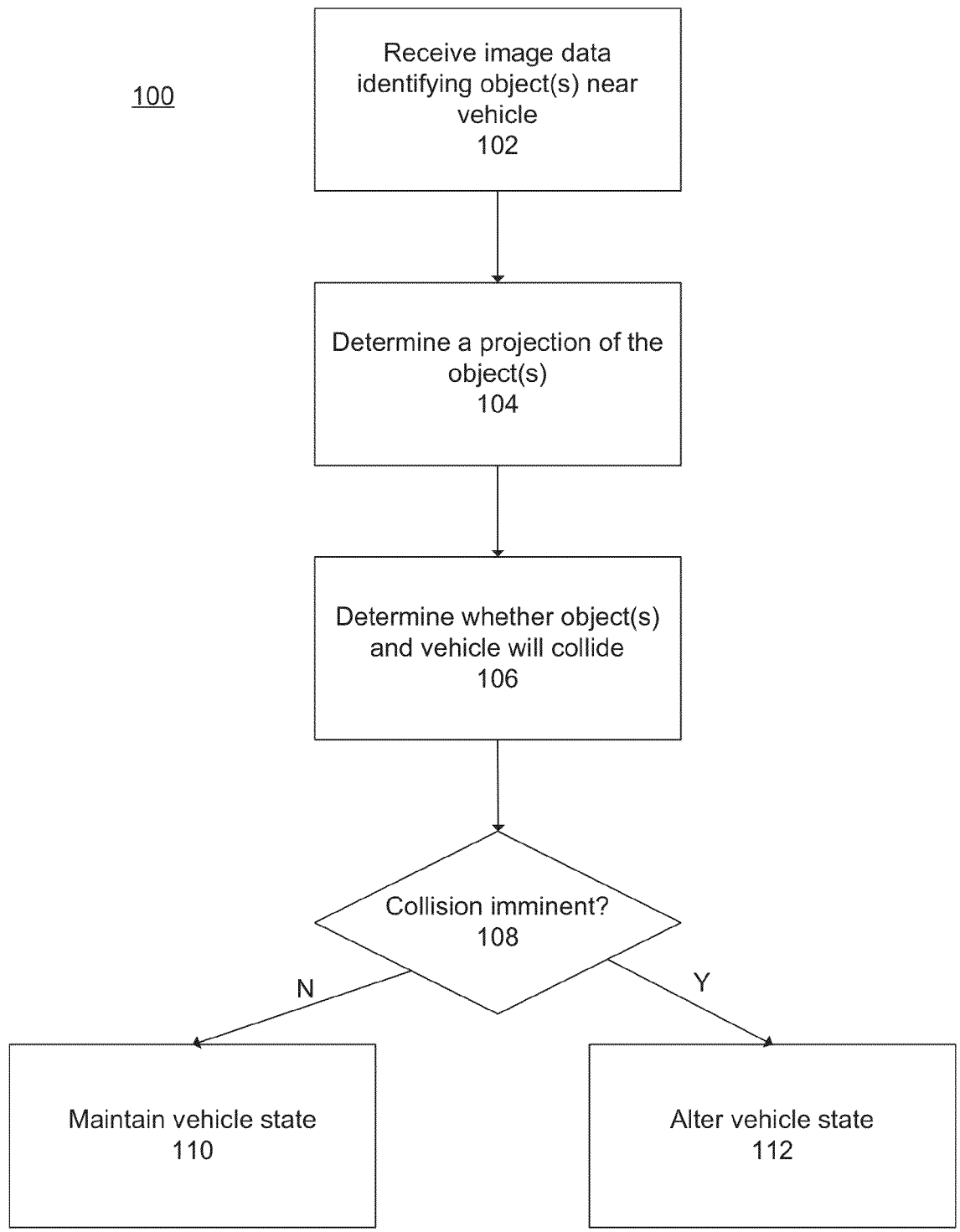
FIG. 1 is a flow diagram of a process for vehicle collision avoidance and mitigation according to an embodiment of the invention.

FIG. 1 is a flow diagram of a process for vehicle collision avoidance and mitigation according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 100 includes an operation for receiving image data identifying terrain, environment or one or more objects near a vehicle, 102. Said image data may be received by one or more imaging or depth sensors included or communicatively coupled to the vehicle. Said image data may comprise photographic or video image data. In some embodiments, said imaging or depth data comprises 3D data in the form of point cloud data, vector data, polygon data or other spatial data and as collected by, but not limited to, device input from Light Detection and Ranging (LiDAR), Flash LiDAR, Sonar, structured light (white light, infrared, etc.), multi stereo-view photogrammetry, Laser Detection and Ranging (LADAR) 'ghost imaging,' etc., as described below.

The received image data is analyzed to determine a projection of terrain, environmental surfaces, and/or one or more objects with respect to the vehicle, 104. Using this projection, it is further determined whether the one or more objects and the vehicle will collide based on the determined projection of the one or more objects with respect to the vehicle, 106. Based on whether a collision is possible, imminent or avoidable 108, the state of the vehicle may be adjusted. In this embodiment, if a collision is not imminent, then vehicle state may be maintained, 110. In response to determining the one or more objects will collide, the vehicle state may be altered, 112.

In some embodiments, altering the vehicle state comprises at least one of adjusting brakes of the vehicle to alter its trajectory, adjusting a steering wheel of the vehicle to alter its trajectory and adjusting an orientation or rotational speed of a flywheel of the gyroscope (for gyroscope assisted vehicles, as described below). Altering the vehicle state may comprise maneuvering the vehicle to avoid colliding with the object(s), or selecting one of a plurality of objects to collide with (e.g., a stationary object, rather than an object moving towards the vehicle). In some embodiments, altering the vehicle state is based, at least in part, on a driver position with respect to the one or more objects determined to collide with the vehicle, as described in further detail below. For example, in situations where a collision is unavoidable, altering the vehicle state may comprise changing a position of the vehicle frame to collide with one or more objects such that the drive is better protected compared to the current vehicle state.

Figure 2A:
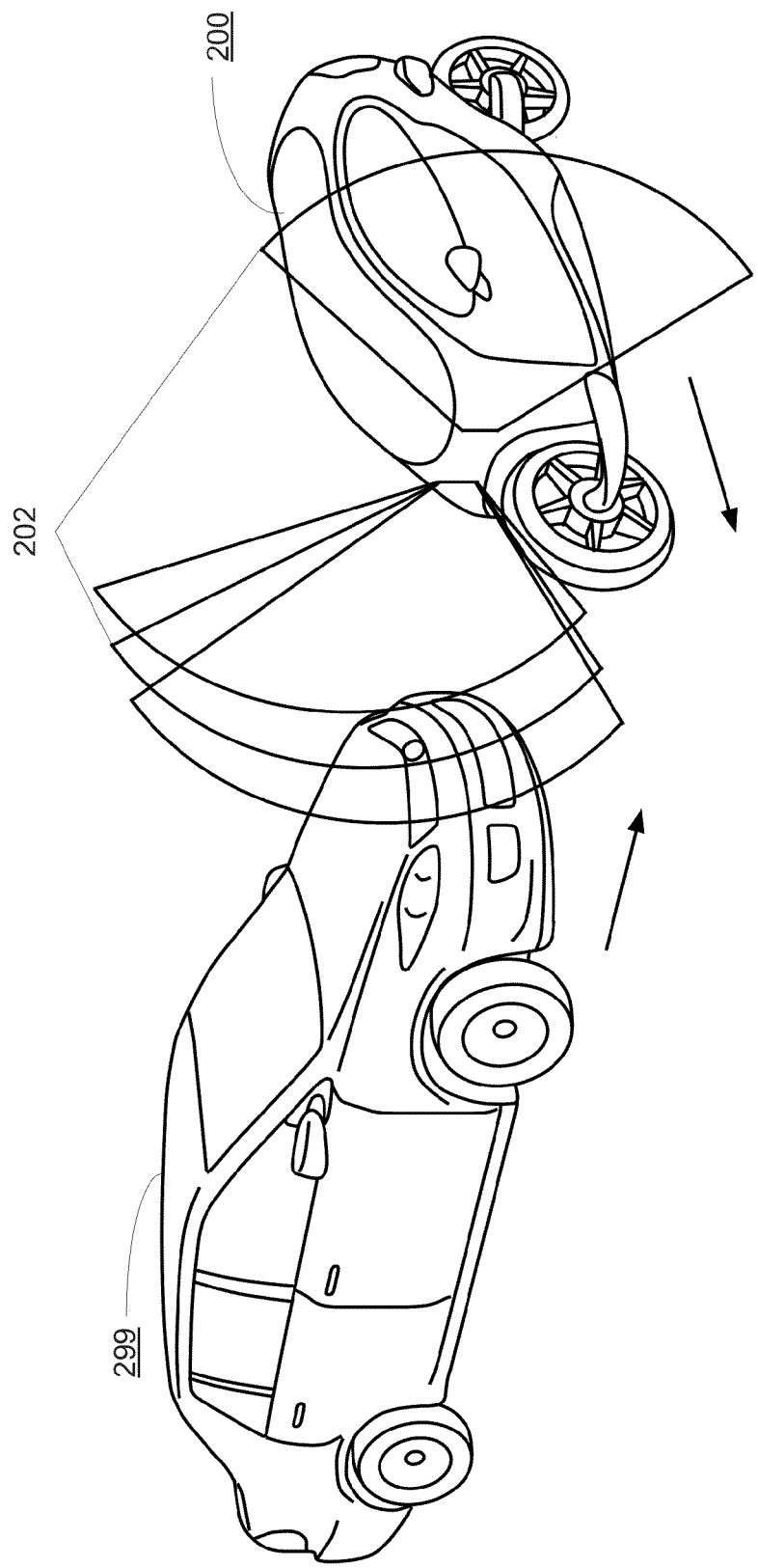
FIG. 2A-FIG. 2B are illustrations of a vehicle incorporating a collision avoidance and mitigation system according to an embodiment of the invention.
Figure 2B:
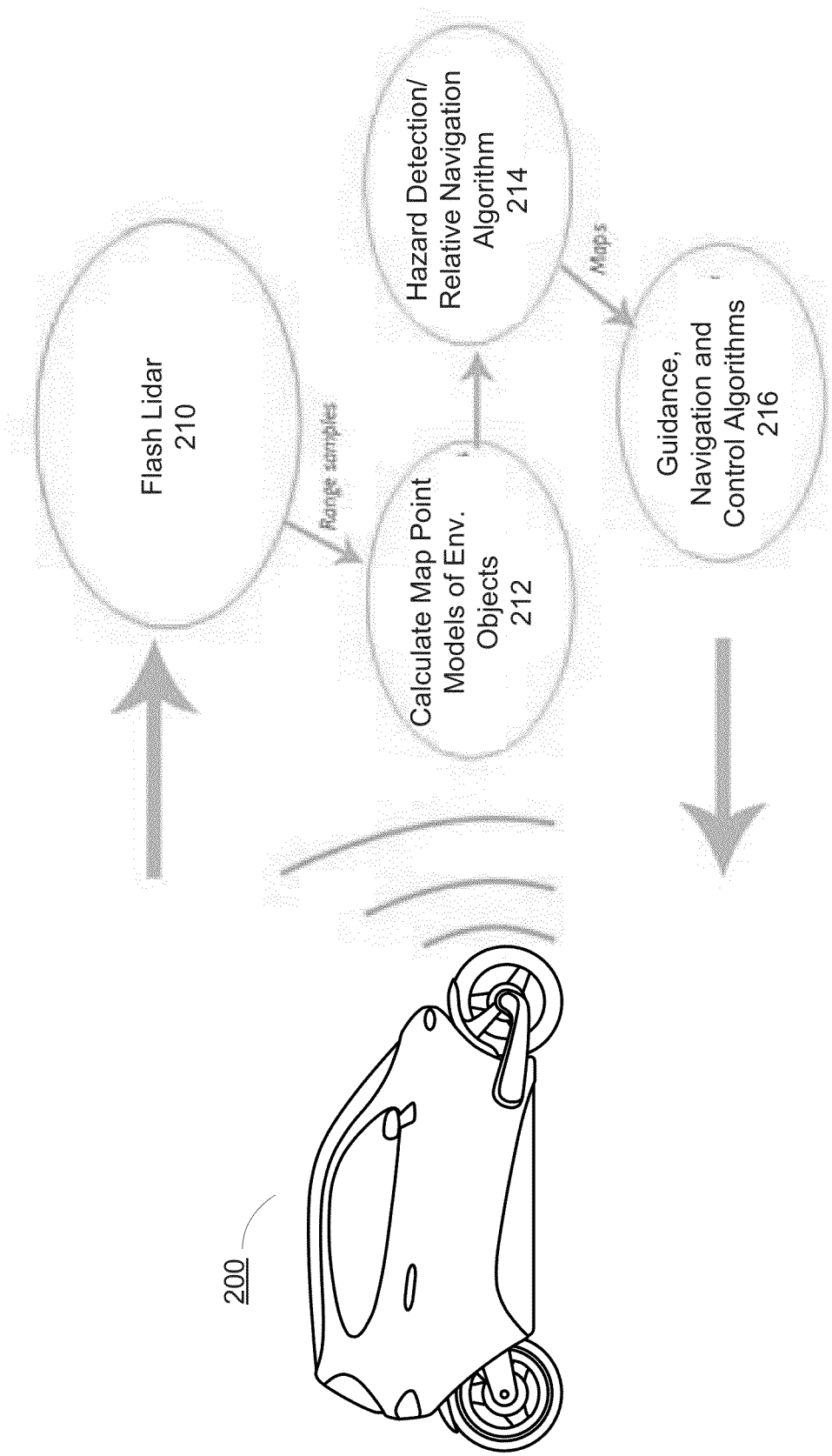

FIG. 2A-FIG. 2B are illustrations of a vehicle incorporating a collision avoidance and mitigation system according to an embodiment of the invention. In this embodiment, vehicle 200 is shown to capture image data 202 of its surrounding environment, including vehicle 299, shown to be on a trajectory to collide with vehicle 202.

While in some embodiments a vehicle may acquire depth sensory input and/or photographic and/or video data, in this embodiment image data 202 is shown to comprise of 3D point cloud data (e.g., collected from LIDAR/photogrammetry/structured light/sonar scan data, or any functional equivalent). For example, the image sensors of vehicle 200 may comprise in-vehicle scanning laser devices to scan an environment approximately two car lengths (20 feet/0.6 meters) in proximity to the vehicle and generate a point cloud. The points of the point cloud each indicate a location of a corresponding point on a surface of object(s) within said range—in this example, oncoming vehicle 299. Data files and models are generated from a series of point cloud or other 3D data tracking the location of the objects in proximity to said vehicle.

Said 3D spatial data may be obtained by LIDAR, stereo imaging, structured light, time-of-flight cameras, or any other technology are used as inputs for generating 3D models, dimensions or locations of objects. This data may be obtained in one or more sensors included in or mounted on one or multiple positions of vehicle 200 (e.g., the forward most, top most, rear-most positions of the vehicle, etc).

As shown in FIG. 2B, in-vehicle modules/logic/circuitry may receive Flash LIDAR data 210 and calculate map point models of environmental objects 212. In this example, the modules/logic/circuitry of vehicle 200 may generate a 3D model of vehicle 299 for processing (e.g., a Computer Aided Design (CAD) model). It is to be understood that a 3D model of an object may include multiple segments representing various contours of the object. For example, a 3D model of an object having a relatively simple shape may be processed as an arrangement of plurality of 2D planes, while objects like vehicle 299, having more complex surface variations, may be processed as an arrangement of both 2D planes and 3D segments.

Hazard Detection/Relative Navigation Algorithm 214 may be executed, in which response scenarios are generated and prioritized. A scenario yielding a favorable outcome is determined as the priority response, and is executed through the coordination of guidance, navigation and control algorithms 216 of vehicle 200. For example, under certain speeds, it may be ideal for vehicle 200 to stop or change directions; in other conditions, vehicle 200 may shifts its position and preemptively deploy in-vehicle airbags to reduce the impact of an unavoidable collision for the driver.

Figure 3A:
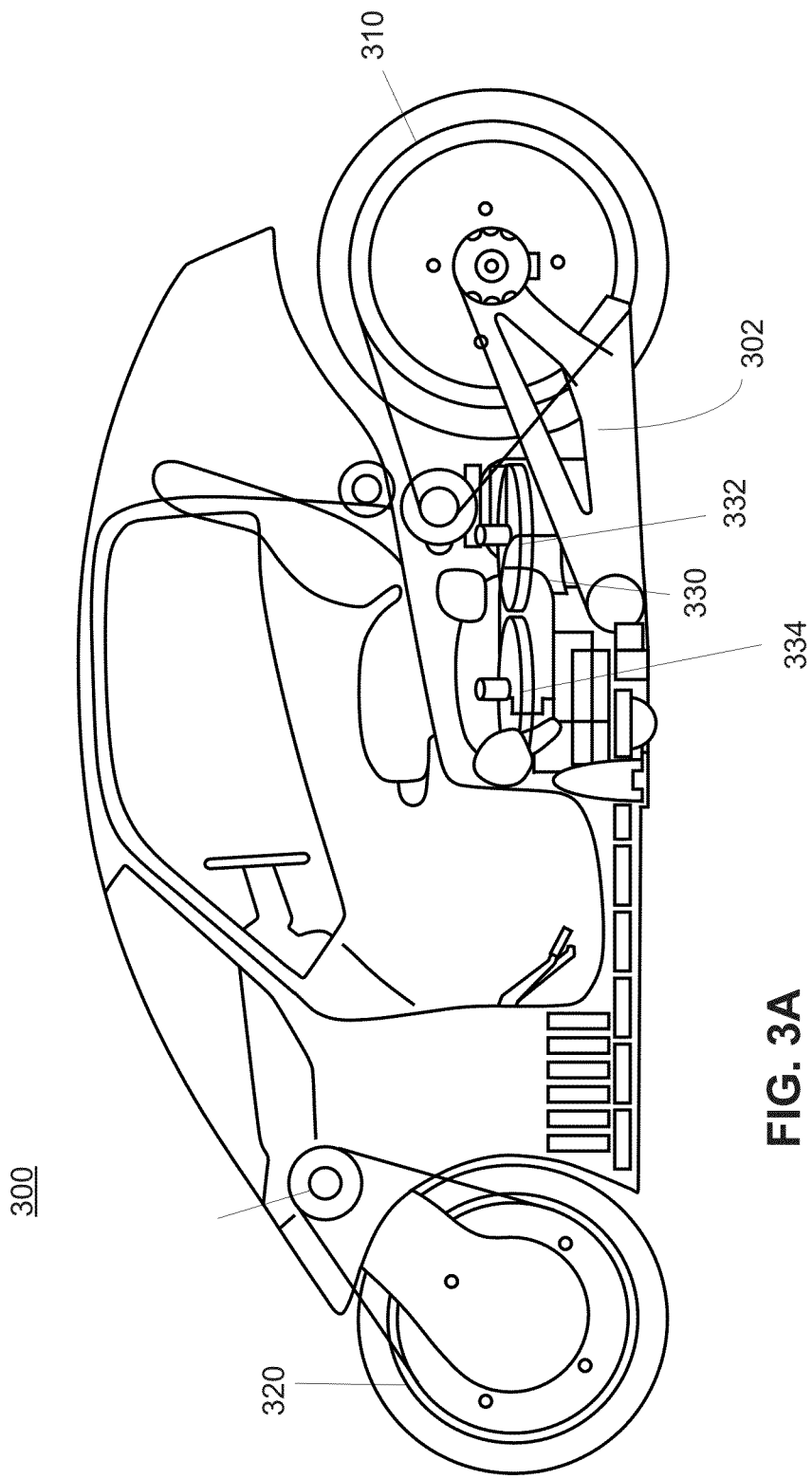
FIG. 3A-FIG. 3B are illustrations of a self-balancing vehicle incorporating a collision avoidance and mitigation system of an embodiment of the invention.
Figure 3B:
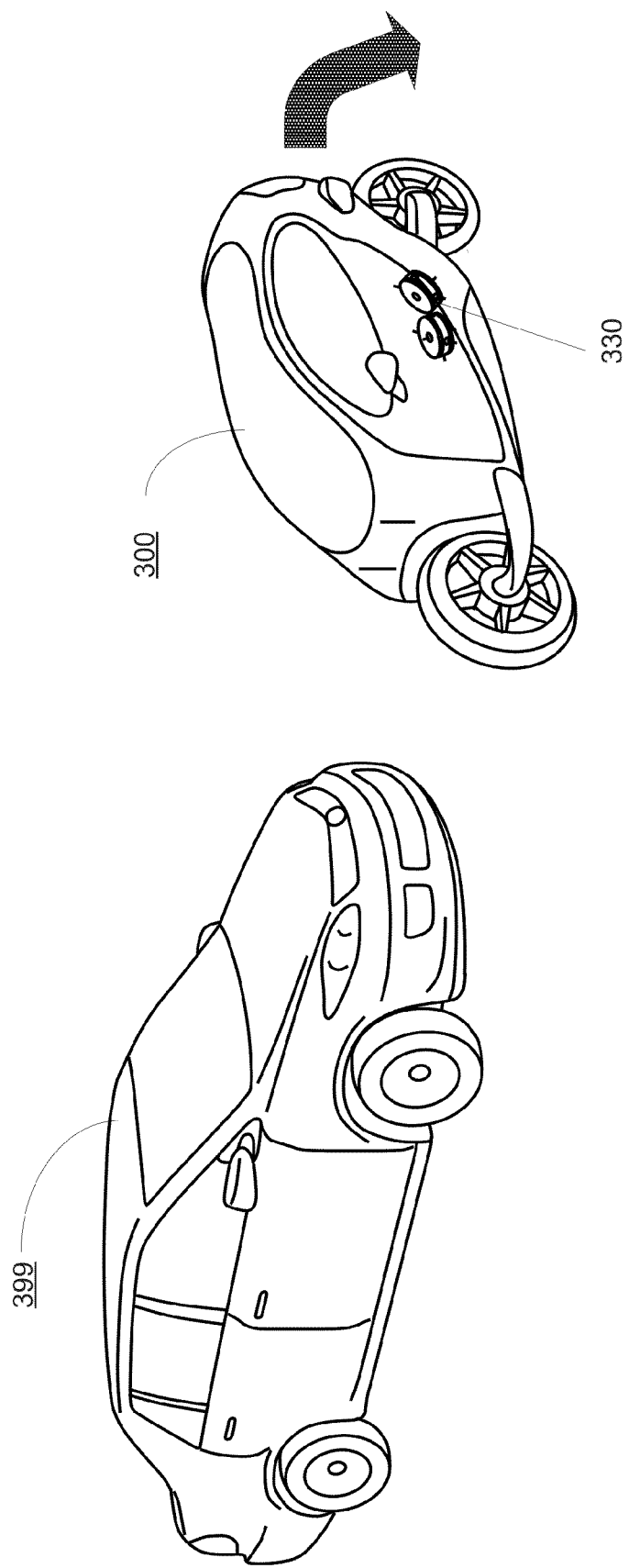

FIG. 3A-FIG. 3B are illustrations of a self-balancing vehicle incorporating a collision avoidance and mitigation system of an embodiment of the invention. In this embodiment, vehicle 300 is shown in FIG. 3A to comprise vehicle frame 302, and further includes first and second drive wheels 310 and 320. First and second drive wheels motor generators may be coupled to drive wheels 310 and 320, respectively, through the use of drive chains/belts. Alternatively, said drive wheel motors may comprise in-wheel hub motors that do not use said drive chains/belts.

Gyro stabilizing unit 330 is coupled to vehicle 300 through vehicle frame 302. Gyro stabilizer 330 may include first and second gyro assemblies housing flywheels 332 and 334; said flywheels may differ in size and material composition, or may be substantially identical. Said first and second gyro assemblies may further house flywheel motor-generators to drive their respective flywheels. In this embodiment, gyro stabilizing unit 330 is utilized to enhance vehicle balance and stability, and is coupled to vehicle 300 through vehicle frame 302.

In some embodiments, vehicle 300 further includes an energy storage unit having a battery bank, capacitor bank, and power switching circuit in electrical communication with said battery bank, capacitor bank, and any of the above described drive wheel motor-generators and flywheel motor-generators. The power switching circuitry may control the operating modes—e.g., vehicular energy storage applications. In other embodiments, said power switching circuitry may comprise digital logic, a processor-executed software module stored on a computer readable medium, or any combination of circuitry, logic and modules.

The basic concept of using gyroscopes to maintain a two-wheeled vehicle upright by using flywheel precession to generate counter-torque is known (while reference is made to gyro-stabilized two-wheeled vehicles in this Specification, the principles of gyro-stabilization may also be used in any vehicles which may have, for example, a narrow track width such that gyro-stabilization is used to stabilize the vehicle or to augment their suspension system in providing stability); however, such systems do not purposely cause a vehicle to have a reduced stability in order to mitigate a collision with another object or vehicle.

As described above, embodiments of the invention may comprise a vehicle system controller for measuring the physical space around the vehicle, identifying objects in this field, and calculating their trajectory. If this trajectory might intersect with the vehicle's intended trajectory then the vehicle can modify its orientation and trajectory through use of, for example, the steering, drive, and gyroscopic orientation systems to mitigate or avoid a potential collision.

In embodiments of the invention, modules/logic may emphasize the detection of a potential instant of a collision of one or more objects, and alter the vehicle state via a steering wheel, brakes, gyroscopes, etc. In some embodiments, the vehicle state is changed based on driver position to the object.

For example, in embodiments incorporated in two-wheeled vehicles, it is understood that side impact is a common type of motorcycle accident. Embodiments of the invention may determined that gyroscopes placed on the bottom of the vehicle should be placed between the object and the driver, and determine the vehicle should lie on its side. As shown in FIG. 3B, vehicle 300 is placed on its side due to the force exerted by gyroscopic stabilization unit 330 such that the driver is protected by the bottom side of the vehicle.

Thus, in some embodiments, driver safety is prioritized over vehicle preservation. Embodiments of the invention may thus alter the vehicle in relation to the driver, in addition to enhancing driver safety by activating other features of the vehicle (e.g., proactively deploy airbags).

Figure 4:
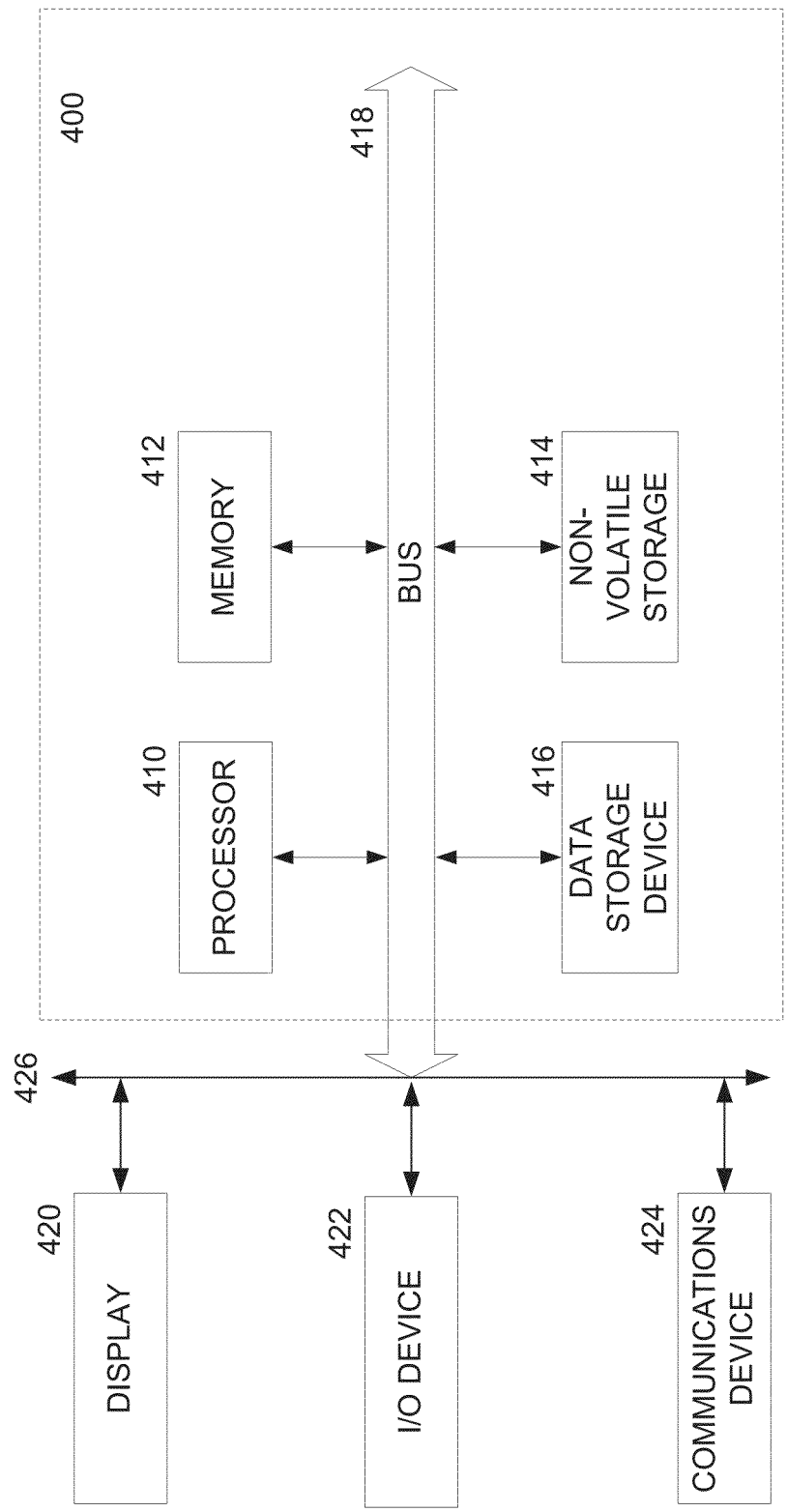
FIG. 4 is an illustration of a computing device to utilize an embodiment of the invention.

FIG. 4 is an illustration of a computing device to utilize an embodiment of the invention. System 400 as illustrated may be any computing device to be included in a vehicle as described herein. As illustrated, system 400 includes bus communication means 418 for communicating information, and processor 410 coupled to bus 418 for processing information. The system further comprises volatile storage memory 412 (alternatively referred to herein as main memory), coupled to bus 418 for storing information and instructions to be executed by processor 410. Main memory 412 also may be used for storing temporary variables or other intermediate information during execution of instructions by processor 710. The system also comprises static storage device 416 coupled to bus 418 for storing static information and instructions for processor 410, and data storage device 414 such as a magnetic disk or optical disk and its corresponding disk drive. Data storage device 414 is coupled to bus 418 for storing information and instructions.

The system may further be coupled to display device 420, such as a cathode ray tube (CRT) or a liquid crystal display (LCD) coupled to bus 418 through bus 426 for displaying information to a computer user. I/O device 422 may also be coupled to bus 418 through bus 426 for communicating information and command selections (e.g., alphanumeric data and/or cursor control information) to processor 410.

Another device, which may optionally be coupled to computer system 400, is a communication device 424 for accessing a network. Communication device 424 may include any of a number of commercially available networking peripheral devices such as those used for coupling to an Ethernet, token ring, Internet, or wide area network. Communication device 424 may further be a null-modem connection, or any other mechanism that provides connectivity between computer system 400 and other devices. Note that any or all of the components of this system illustrated in FIG. 4 and associated hardware may be used in various embodiments of the invention.

It will be appreciated by those of ordinary skill in the art that any configuration of the system may be used for various purposes according to the particular implementation. The control logic or software implementing embodiments of the invention can be stored in main memory 412, mass storage device 414, or other storage medium locally or remotely accessible to processor 410.

Communication device 424 may include hardware devices (e.g., wireless and/or wired connectors and communication hardware) and software components (e.g., drivers, protocol stacks) to enable system 400 to communicate with external devices. The device could be separate devices, such as other computing devices, wireless access points or base stations, as well as peripherals such as headsets, printers, or other devices.

Communication device 424 may be capable of multiple different types of connectivity—e.g., cellular connectivity and wireless connectivity. Cellular connectivity refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity refers to wireless connectivity that is not cellular, and can include personal area networks (such as Bluetooth), local area networks (such as WiFi), and/or wide area networks (such as WiMax), or other wireless communication.

It will be apparent to those of ordinary skill in the art that the system, method, and process described herein can be implemented as software stored in main memory 412 or read only memory 416 and executed by processor 410. This control logic or software may also be resident on an article of manufacture comprising a computer readable medium having computer readable program code embodied therein and being readable the mass storage device 414 and for causing processor 410 to operate in accordance with the methods and teachings herein.

Figure 5A:
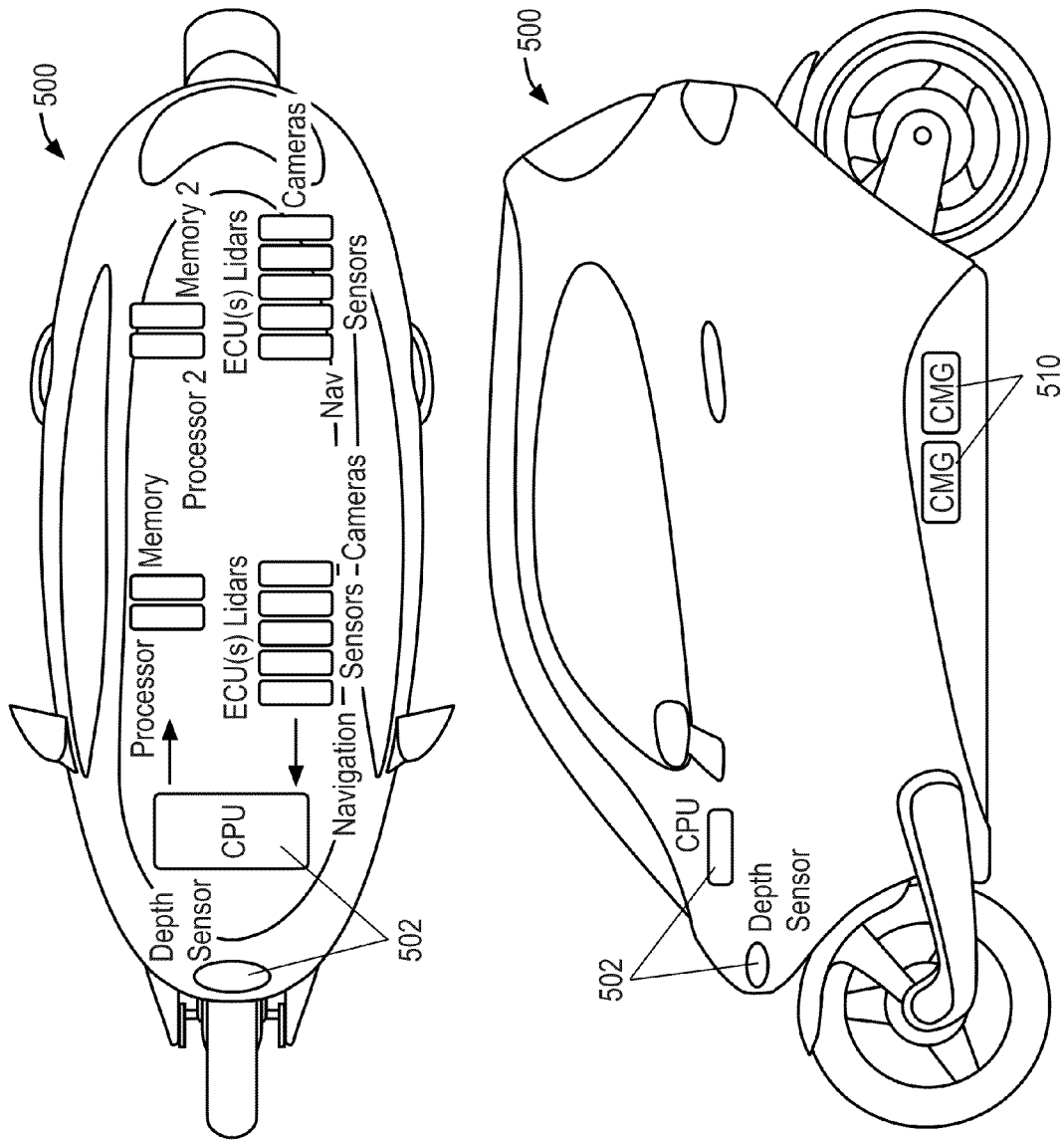
FIG. 5A-FIG. 5B are illustrations of a control system for controlling a collision avoidance and mitigation system according to an embodiment of the invention.
Figure 5B:
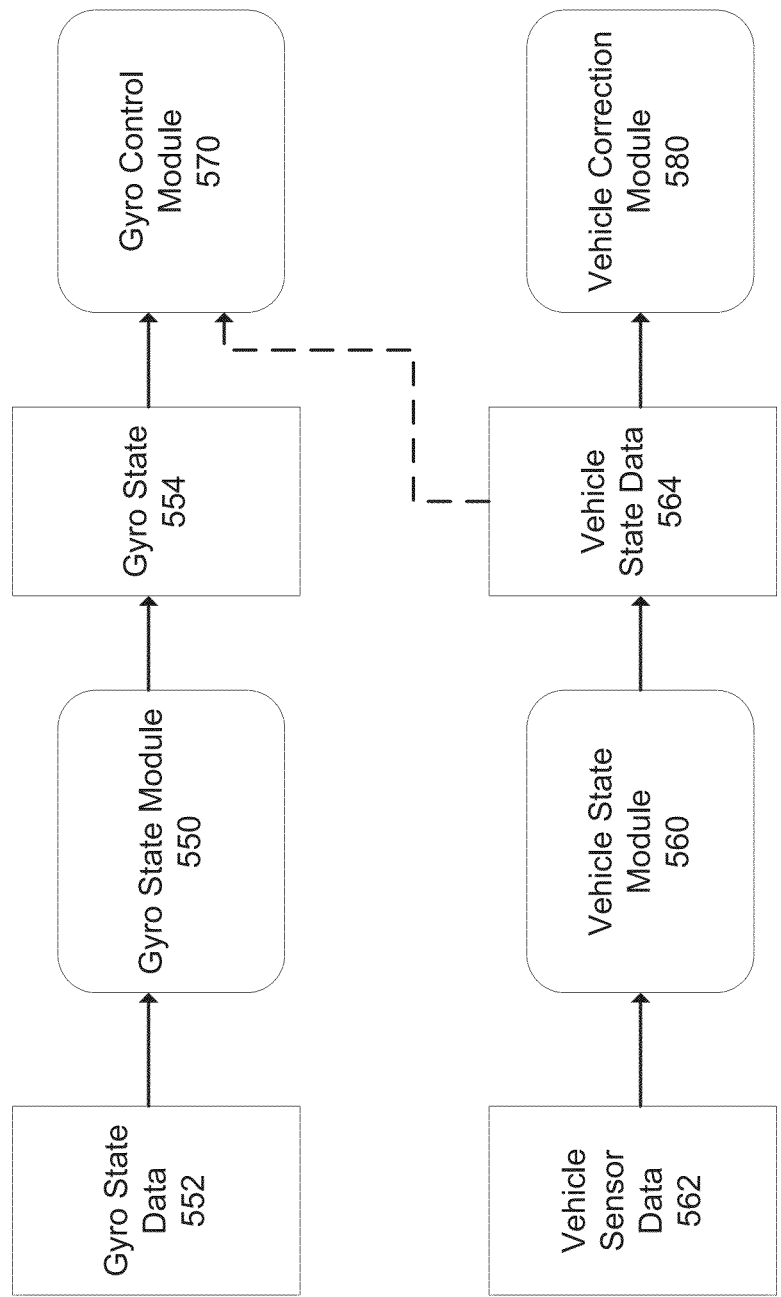

FIG. 5A-FIG. 5B are illustrations of a control system for controlling a collision avoidance and mitigation system according to an embodiment of the invention. FIG. 5A illustrates and top and side view of vehicle 500 including computing system 502 comprising a plurality of processors, sensors and cameras, as well as CMG apparatus 510.

Vehicle computing system 502 receives spatial data identifying at least one of terrain, environment, or one or more objects near vehicle 500. Utilizing said spatial data, system 502 determines a projection of the terrain/environment/objects with respect to the vehicle and determines whether said terrain/environment/objects will affect the vehicle state (e.g., whether the one or more objects are to collide with the vehicle based on the determined projection of the one or more objects). In response to determining said terrain/environment/objects will affect the vehicle state, system 502 alters the state of vehicle 500 via active controls to CMG apparatus 510.

As illustrated in FIG. 5B, computing system modules may receive information from vehicle sensors to determine various states of the vehicle and its components. In this example, FIG. 5 illustrates gyro state module 550 for determining the state of the vehicle's gyros (e.g., CMGs), vehicle state module 560 for determining the state of the vehicle, gyro control module 570 for controlling the vehicle's gyros, and vehicle correction module 580 for controlling other aspects of the vehicle. Although shown as separate modules for illustrative purposes, it is to be understood that modules 550, 560, 570 and 580 may actually comprise a fewer or a greater number of modules, and that in lieu of modules, embodiments of the invention may comprise circuitry, logic or any combination of these means.

Gyro state module 550 is shown to receive sensor data 552 from the sensors of the vehicle's gyroscopes—e.g., data from flywheel sensors coupled to each flywheel of the vehicle. Said flywheel sensors produce signals indicating important measurements including flywheel tilt angle relative to the vehicle frame, flywheel tilt velocity (i.e. the rotational velocity at which the precession motor is rotating the flywheel about its precession axis), and the disk velocity (i.e. the rotation speed of the flywheel disk about its axis of rotation). Sensor data 552 may also comprise data indicating the current precession axes of the gyros. Gyro state module 550 may use this information to determine the actual instantaneous magnitude and direction of the moment exerted by the gyro stabilizers vehicle, shown as gyro state data 554.

Vehicle state module 560 is shown to receive sensor data 562, which may comprise sensor data related to the vehicle's state, including its inertial state, absolute state. A vehicle's inertial state may indicate the rotational and linear acceleration, velocity, and position of the vehicle, while a vehicle's absolute state may indicate the vehicle tilt angle direction and magnitude, as well as vehicle direction of travel, speed over ground and absolute geographic position provided by sensors including, but not limited to, an electronic compass, Inertial Measuring Unit (IMU) and GPS receiver. Sensor data 562 may also comprise data indicating drive wheel speed (i.e. rotational speed of each of the drive wheels), the brake status (i.e. the rate of decrease of the vehicle drive wheel and rotational speeds), user inputs to the vehicle through the accelerator and brake, and the ordered turn radius of the vehicle through its steering unit, etc. Furthermore, as discussed above, vehicle sensor data 562 may include environmental/object sensor input data, such as the above described LIDAR photogrammetry data, structure light (infrared/white) sonar scan data, etc. Vehicle state module 560 produces vehicle state data 564, which may identify the vehicle's current projection towards oncoming terrain, environmental conditions, and/or objects.

Vehicle correction module 580 uses vehicle state data 564 to predict future vehicle scenarios (e.g., collisions) determine the vehicle's proper tilt angle for said predicted scenarios. Gyro control module 570 uses gyro data 554 and works in conjunction with vehicle module 580 to change the operating state of the vehicle's gyros—e.g., flywheel speeds, precession angles, and/or increases/decreases to the precession axes of the flywheels to produce sufficient torque to change the vehicle state for the predicted scenario. In some embodiments, vehicle correction module 580 executes an in-event assessment of the vehicle state, and records post-event data to determine if the altered vehicle state handled the predicted scenario(s) adequately, for continued module performance improvement.

Embodiments of the invention further describe cooling systems for vehicles to cool various vehicle components, including motor components, electrical components, and/or electrical interconnect components.

Embodiments of the invention may include various components for cooling the heat generating components of a vehicle, such as vehicle 300 of FIG. 3A. For example, one component may be a radiator core or heat sink disposed near the bottom of the vehicle to absorb heat from the various components. In another example, cooling liquid is routed via liquid routing means to the various components for cooling (and also to the above described heat sink/radiator core, if applicable). Said liquid may be routed from the main chassis from a reservoir system within the vehicle, possibly delivered via power delivery wires. Furthermore, embodiments of the invention may utilize said circulating liquid to distribute heat generated by the heat sources of the system to one or more heat sinks of the system (e.g., a cabin heating subsystem).

Figure 6:
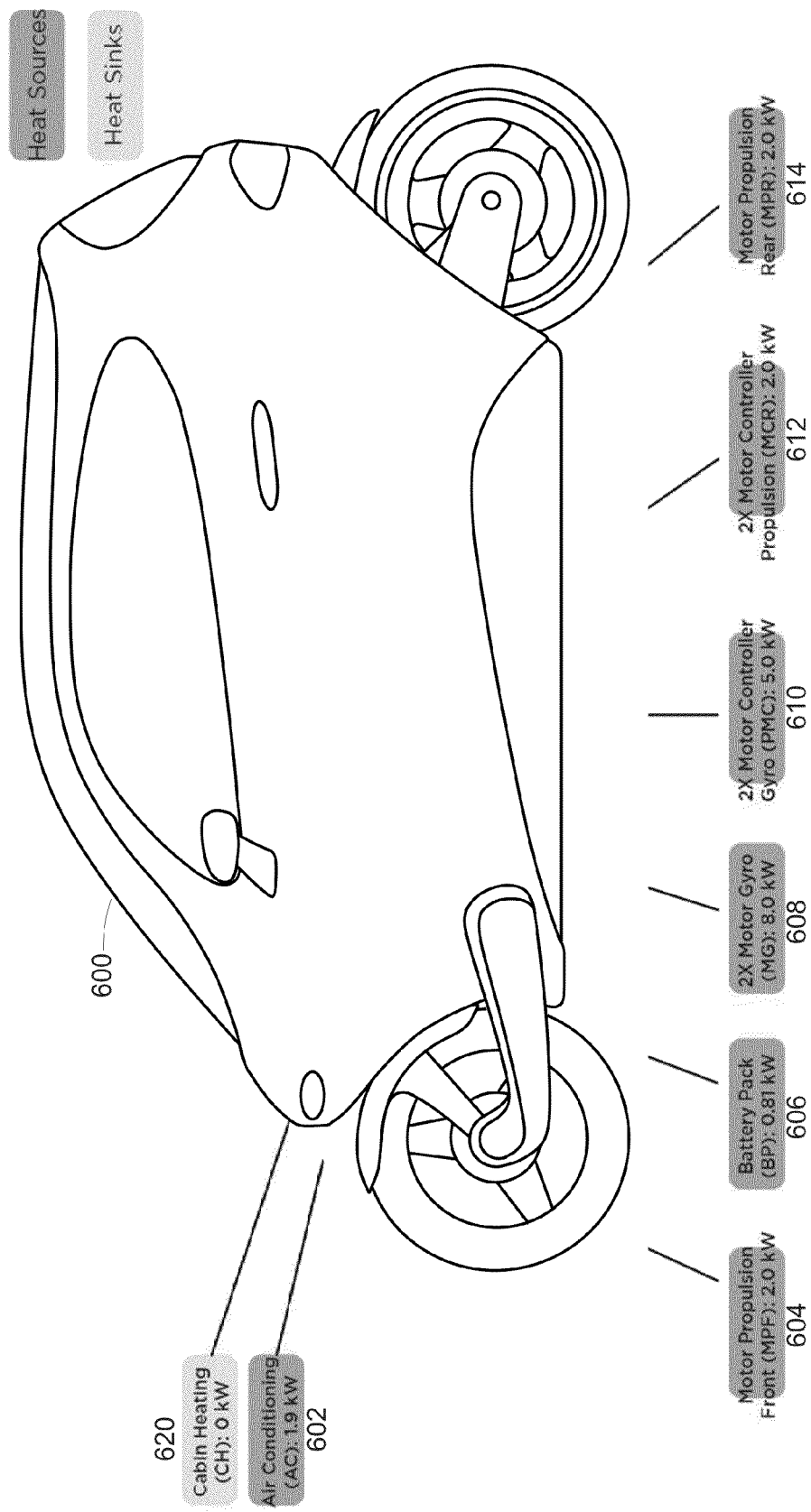
FIG. 6 is an illustration of vehicle heat sinks and sources to utilize a vehicle cooling system according to an embodiment of the invention.

FIG. 6 is an illustration of vehicle heat sinks and sources to utilize a vehicle cooling system according to an embodiment of the invention. In this embodiment, vehicle 600 is shown to have a plurality of motor and electrical components that may generate heat during operation of the vehicle: air conditioning unit 602, front wheel motor propulsion unit 604, battery pack 606, gyroscope motors 608, gyroscope motor controllers 610, propulsion motor controllers 612, and rear wheel motor propulsion unit 614. Furthermore, in this embodiment, cabin heating unit 620 is illustrated to be a heat sink that may draw heat from the above described heat generating components of vehicle 600.

Embodiments of the invention may include various components for cooling the heat generating components of vehicle 600. For example, one component may be a radiator core or heat sink disposed near the bottom of vehicle 600 to absorb heat from the various components. In another example, cooling liquid is routed via liquid routing means to the various components for cooling (and also to the above described heat sink/radiator core, if applicable). As used herein, the term "liquid routing means" may describe metal or plastic piping, tubing, or any functionally equivalent means form transferring liquid. Said liquid may be routed from the main chassis from a reservoir system within the vehicle, possibly delivered via power delivery wires. Furthermore, embodiments of the invention may utilize said circulating liquid to distribute heat generated by the heat sources of the system to one or more heat sinks of the system (e.g., cabin heating unit 620).

Thus, in some embodiments, vehicle 600 utilizes gyroscopic housing and motor cooling, including integrated tubular or channel routing of cooling liquid around and or within the gyro motors; controller cooling, integrated tubular or channel routing of cooling liquid for the electronic controllers of the vehicle (e.g., motor controllers, engine control units (ECUs), computing device controllers); traction/drive motor cooling, including integrated tubular or channel routing of cooling liquid for the traction motors; battery cooling, including integrated tubular or channel routing of cooling liquid for cooling the batter; and electrical interconnect cooling, including liquid cooling routed, for example, adjacent to the wiring lines to allow for full simultaneous system cooling of the various system components, and the electrical interconnects themselves. Having cooling lines running next to the power transmission lines further utilizes existing necessary routing systems like a wiring harness as dual purpose to create a compact full system cooling method that also supplies cooling to all electrical components directly. In some embodiments, several heat sources of vehicle 600 may be hard-mounted to the vehicle chassis (and/or, a heat-sink component of the chassis as described below) to enhance the cooling of these products.

Figure 7:
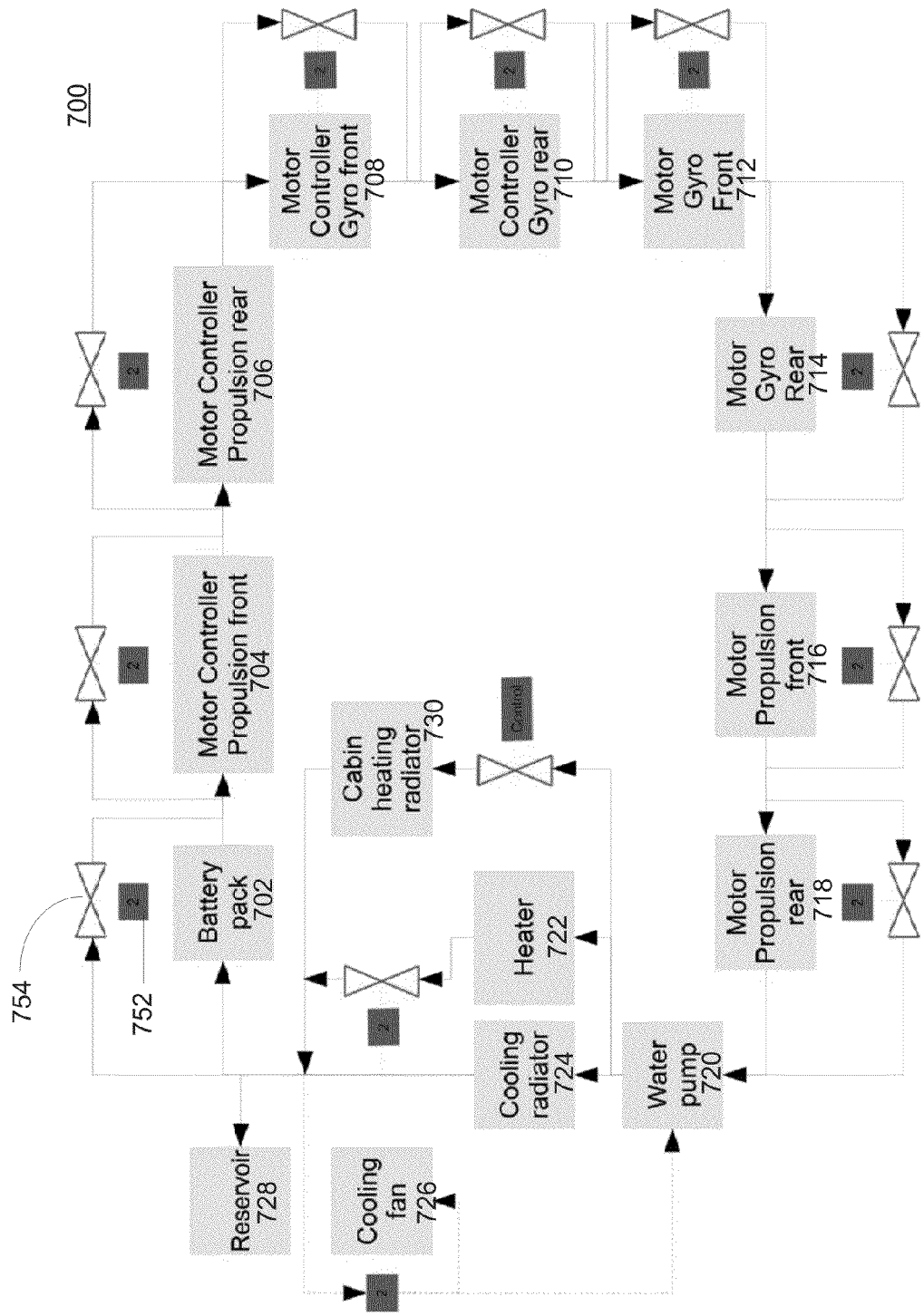
FIG. 7 is a diagram of a system cooling circuit according to an embodiment of the invention.

FIG. 7 is a diagram of a system cooling circuit according to an embodiment of the invention. In this embodiment, vehicle component system 700 is shown to include battery pack 702, front propulsion motor controller 704, rear propulsion motor controller 706, front gyro motor controller 708, rear gyro motor controller 710, front gyro motor 712, rear gyro motor 714, front propulsion motor 716, rear propulsion motor 718, water pump 720, heater 722, cooling radiator 724, cooling fan 726, liquid reservoir 728, and cabin heating radiator 730. Said system components may be mounted in series, in parallel, or in any combination.

In this example, the sequence of the components in system 700 starts with the product with the lowest operating temperature (i.e., battery pack 702) and ends with the module(s) with the highest operating temperature (i.e., rear propulsion motor 718). Each of the above described system components may have by-pass controller circuitry/modules/logic (e.g., controller 752 for battery pack 702) with a closed-loop temperature control to regulate its ideal operating point, using a temperature sensor on or integrated with the respective component. Each of the above described controllers may control a valve (e.g., valve 754 for batter pack 702) to control flow of the cooling liquid for the respective component for regulating its temperature towards its ideal operating point. In other embodiments, all temperature measurements may be fed to a centralized computing device, which determines the opening or closing of the system's bypass valves.

Heater 722 may use the liquid coolant that is heated by all the heat-producing components in system 700. Cooling radiator 724 and cooling fan 726 may be used to cool the liquid coolant that is heated by all the heat-producing components in system 700. In some embodiments, a bypass valve around cooling radiator 724 may be opened when the system is cold and needs to heat up before operation. This bypass valve may be in series with a heating element of system 700.

In some embodiments, water pump 720 and/or cooling fan 726 may be run in switching or Pulse Width Modulation (PWM) mode depending on the temperature of the coolant as it exits cooling radiator 724. PWM cooling is an open-loop system that turns a by-pass valve on/off to prevent the cooling liquid from cooling the product. Due to the relatively high thermal mass of the some of the components to be cooled, this may produce low thermal oscillations by design.

PWM cooling reduces the complexity of the cooling system comprising several components that are operating at different temperatures. It may utilize only one liquid pump, one cooling medium and one cooling circuit. This is in contrast to conventional cooling systems with products running at different temperatures—several circuits with each its own liquid pump are needed, as well as additional coolers or heat exchangers.

A bypass valve around the cooling radiator can be opened when the system is cold and needs to heat up before operation. This bypass may be in series with a heating element. Furthermore, cooling lines running between the various components may also run alongside the power lines of the vehicle. In order to enhance cooling the power lines (i.e., the electrical interconnects of system 700), insulation material of said power lines may be chosen to have a low electrical conductivity and a high thermal conductivity.

Figure 8A:
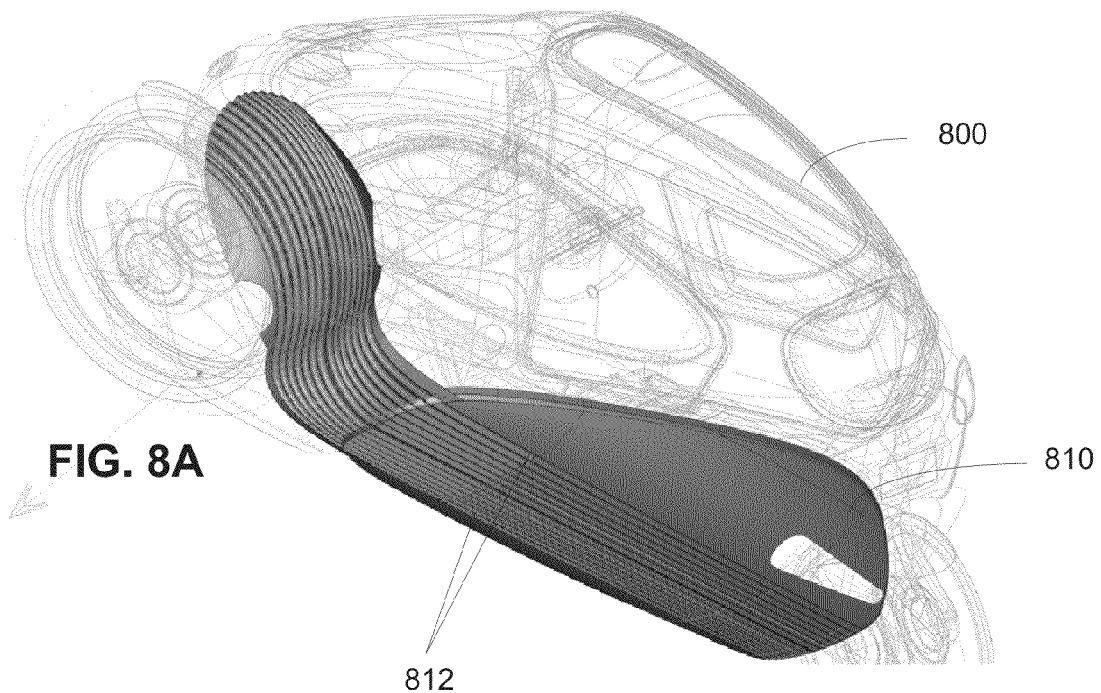
FIG. 8A and FIG. 8B are illustrations of sub-frame components utilized by vehicle cooling systems according to embodiments of the invention.
Figure 8B:
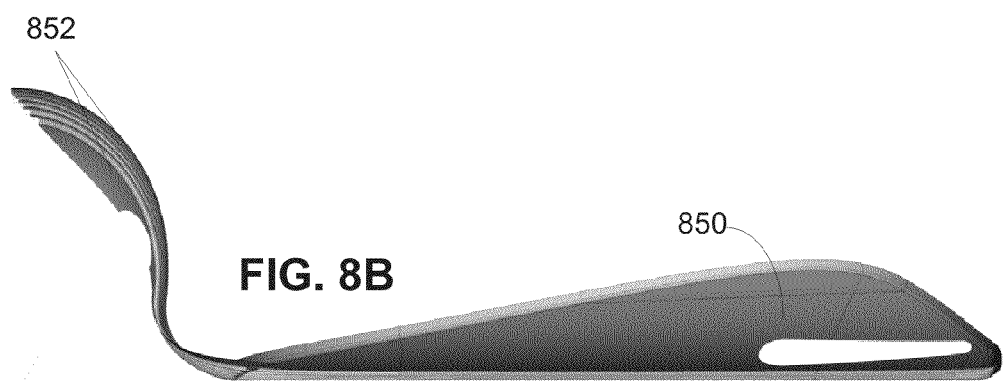

FIG. 8A and FIG. 8B are illustrations of sub-frame components utilized by vehicle cooling systems according to embodiments of the invention. In FIG. 8A, vehicle 800 is shown to include sub-frame component 810 disposed at the bottom of the vehicle. Said sub-frame component may comprise a radiator core to cool liquid coolant of the vehicle.

The location of sub-frame component 810 may be selected based on the location of power delivery and/or gyro-systems utilized by vehicle 800, and shaped in a way to utilize natural air cooling to critical power components. Said sub frame cooling and heating control may be used for interior cabin climate control—e.g., excess heat can be dissipated into the cabin as a hot air supply, as well as excess cabin heat being dissipated into the sub chassis as radiative cooling.

In this embodiments, sub-frame component 810 and the vehicle body are shown to comprise a single unitary body. FIG. 8B illustrates sub-frame component 850, which comprises a separate component from the vehicle frame. Said sub-frame components may be made of any material with a high thermal conductivity. In some embodiments, several vehicle heat sources may be hard-mounted to this chassis to enhance the cooling of these components.

In some embodiments, sub-frame components may include one or more channels formed for guiding air to and from the heat sink. For example, sub-frame components 810 and 850 are shown to include air channels 812 and 852, respectively, to utilize the air flow of vehicle 800 when it is moving forward to cool the sub-frame component.

Figure 9A:
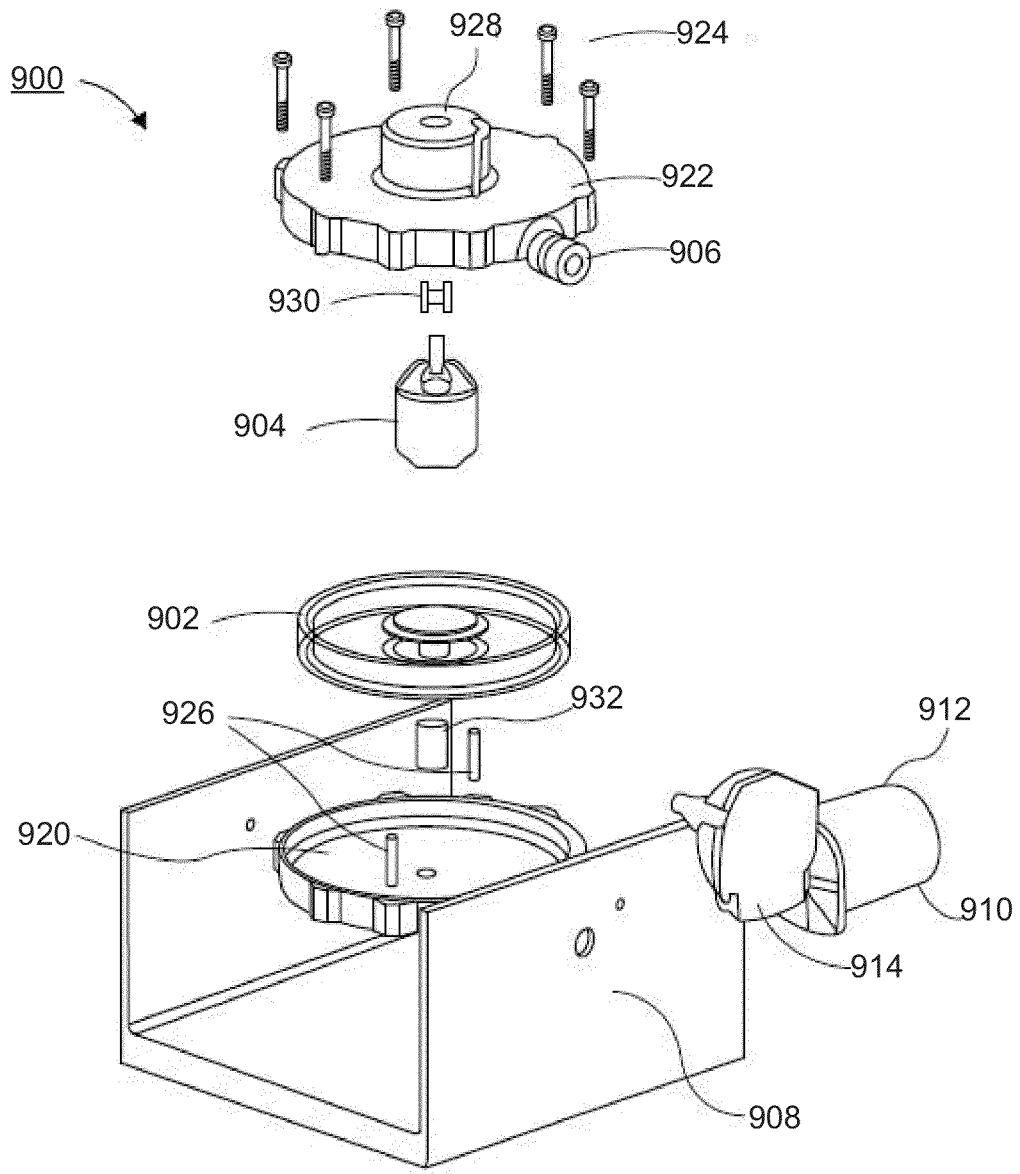

FIG. 9A and FIG. 9B are illustrations of a gyroscopic device to utilize a cooling component according to an embodiment of the invention. FIG. 9A is an illustration of an example gyroscopic stabilization unit. In embodiments of the invention, vehicles utilize gyroscopic stabilization units to improve vehicle stability during various driving conditions—e.g., at rest, at low speeds, and during a turn.

Gyro assembly 900 is illustrated to include flywheel 902, flywheel motor-generator 904 coupled to the flywheel, gimbal 906 coupled to the motor-generator, and precession motor 910 having drive portion 912 (for coupling to gimbal 906) and frame portion 914 (for coupling to the vehicle including the gyro assembly). In this embodiment, precession motor-generator frame portion 914 is coupled to the vehicle through mounting bracket 908, which is fixedly mounted to the vehicle frame.

Flywheel 902 is contained within a gyro housing having bottom portion 920 and top portion 922, which in this embodiment are assembled using threaded fasteners 924 and alignment pins 926. Gyro hosing top portion 922 includes gimbal 906, which provides the precession axis for processing the gyro assembly to create the counter-torque that may maintain stability for vehicle 900, as well as bearing housing 928 to support flywheel 902. Motor-generator mount bolts 930 and flywheel mount bolts 932 are provided to couple flywheel motor-generator 904, flywheel 902 and the gyro housing. In this embodiment, flywheel 902 and flywheel motor-generator 904 are both contained within gyro upper and lower housing portions 922 and 920, for ease of maintenance and protection. Gyro stabilizer 900 may theoretically be located anywhere on the vehicle so long is it can be coupled to the vehicle frame in order to transmit the counter-torque of one or more precession motors (e.g., motor 910) to the vehicle frame. For example, gyro stabilizer 900 may be located approximately at the anticipated vertical and fore-aft center of gravity ("CG") of the vehicle at standard conditions.

FIG. 9B illustrates a housing component may include liquid routing means 950 for routing liquid for cooling the gyroscope apparatus. In this example, lower housing component 920 is shown to include said liquid routing means. In other embodiments, upper housing component 922 may also or alternatively include said liquid routings means, or a separate component of the gyro assembly may include said liquid routing means.

Computing systems, such as computing system 400 of FIG. 4, may be used to control vehicle cooling systems, as described above, and may also be cooled by said vehicle cooling system, as the electrical/computing components of said system may generate heat.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

Methods and processes, although shown in a particular sequence or order, unless otherwise specified, the order of the actions may be modified. Thus, the methods and processes described above should be understood only as examples, and may be performed in a different order, and some actions may be performed in parallel. Additionally, one or more actions may be omitted in various embodiments of the invention; thus, not all actions are required in every implementation. Other process flows are possible.

The invention claimed is:

1. A non-transitory machine readable storage medium having instructions that, when executed, causes a machine to execute a method comprising:

receiving spatial data identifying at least one of terrain, environment, or one or more objects near a vehicle;

determining a projection of the terrain, the environment, or the one or more objects with respect to the vehicle;

determining whether the terrain, the environment, or the one or more objects are to adversely affect the vehicle based on the determined projection of the terrain, the environment, or the one or more objects; and in response to determining the terrain, the environment, or the one or more objects are to adversely affect the vehicle, altering the vehicle state via control moment gyroscope (CMG) active controls to change the projection of the vehicle frame with respect to the terrain, the environment, or the one or more objects, wherein the vehicle further includes a gyroscope coupled to a vehicle frame, and altering the vehicle state comprises adjusting an orientation or rotational speed of a flywheel of the gyroscope.

2. The non-transitory machine readable storage medium of claim 1, wherein determining the objects are to adversely affect the vehicle comprises determining the one or more objects are to collide with the vehicle, and altering the vehicle state is based, at least in part, on a driver position with respect to the one or more objects determined to collide with the vehicle.

3. The non-transitory machine readable storage medium of claim 2, wherein altering the vehicle state comprises changing a portion of the vehicle frame to collide with the one or more objects.

4. The non-transitory machine readable storage medium of claim 1, wherein the spatial data comprises 3D spatial data, such as point cloud data.

5. The non-transitory machine readable storage medium of claim 4, wherein the 3D spatial data is comprised from any depth or image sensory input such as Light Detection and Ranging (LIDAR) data.

6. The non-transitory machine readable storage medium of claim 1, wherein altering the vehicle state comprises adjusting brakes of the vehicle to alter its trajectory to avoid the terrain, the environment, or the one or more objects.

7. The non-transitory machine readable storage medium of claim 1, wherein altering the vehicle state comprises adjusting a steering wheel of the vehicle to alter its trajectory to avoid the terrain, the environment, or the one or more objects.

8. The non-transitory machine readable storage medium of claim 1, wherein the spatial data is received from one or more sensors included in the vehicle.

9. A vehicle comprising:
a frame;
a Control Moment Gyroscope (CMG) coupled to the frame;
a front wheel and a rear wheel coupled to the frame;
one or more image sensors coupled to the frame; and
a system controller to:
receive image data from the one or more image sensors identifying at least one of terrain, environment, or one or more objects near a vehicle;
determine a projection of the terrain, the environment, or the one or more objects with respect to the vehicle;
determine whether the terrain, the environment, or the one or more objects are to adversely affect the vehicle based on the determined projection of the terrain, the environment, or the one or more objects; and
in response to determining the terrain, the environment, or the one or more objects are adversely affect the vehicle, alter the vehicle state to change the projection of the vehicle frame via control moment gyroscope (CMG) active controls with respect to the terrain, the environment, or the one or more objects, wherein altering the vehicle state comprises adjusting an orientation or rotational speed of a flywheel of the CMG.

10. The vehicle of claim 9, wherein determining the objects are to adversely affect the vehicle comprises determining the one or more objects are to collide with the vehicle, and altering the vehicle state is based, at least in part, on a driver position with respect to the one or more objects determined to collide with the vehicle.

11. The vehicle of claim 10, wherein altering the vehicle state comprises changing a portion of the vehicle frame to collide with the one or more objects.

12. The vehicle of claim 10, wherein altering the vehicle state comprises adjusting brakes of the vehicle to alter its trajectory to avoid the terrain, the environment, or the one or more objects.

13. The vehicle of claim 10, wherein altering the vehicle state comprises adjusting a steering wheel of the vehicle to alter its trajectory to avoid the terrain, the environment, or the one or more objects.

14. The vehicle of claim 10, wherein the one or more image sensors are included in a body of the vehicle.

15. The vehicle of claim 9, wherein the image data comprises 3D spatial data.

16. The vehicle of claim 15, wherein the 3D spatial data comprises depth and image sensory input such as Light Detection and Ranging (LIDAR) data.

* * * * *